United States Patent
Besnard

(10) Patent No.: US 6,750,767 B2
(45) Date of Patent: Jun. 15, 2004

(54) DEVICE FOR MONITORING, NEUTRALIZING AND DESTRUCTION OF SECURITIES, DOCUMENTS AND OTHER OBJECTS

(75) Inventor: Philippe Besnard, Griselles (FR)

(73) Assignee: Brink's France, Paris (FR)

( * ) Notice: Subject to any disclaimer, the term of this patent is extended or adjusted under 35 U.S.C. 154(b) by 0 days.

(21) Appl. No.: 10/084,469

(22) Filed: Feb. 28, 2002

(65) Prior Publication Data

US 2002/0160750 A1 Oct. 31, 2002

(30) Foreign Application Priority Data

Feb. 28, 2001 (FR) .............................. 01 02750

(51) Int. Cl.$^7$ .............................. G08B 1/08; H04Q 7/00
(52) U.S. Cl. .............................. 340/539.1; 340/539.13; 340/568.1; 340/568.7; 340/571; 235/384
(58) Field of Search .................. 340/539.1, 539.11, 340/539.13, 539.23, 568.1, 568.7, 571; 235/379, 382.5, 384, 439

(56) References Cited

U.S. PATENT DOCUMENTS 4,352,097 A * 9/1982 Hamann ..................... 340/571
5,388,433 A    2/1995 Andersson et al. .......... 70/57.1
5,952,920 A * 9/1999 Braddick ................. 340/568.1
6,191,690 B1 * 2/2001 Mukogawa ............... 340/568.7
6,259,366 B1 * 7/2001 Lindskog et al. ........ 340/568.7

FOREIGN PATENT DOCUMENTS

GB        2218533       11/1989
WO     WO 99/58799      11/1999

* cited by examiner

Primary Examiner—Toan N. Pham
(74) Attorney, Agent, or Firm—Young & Thompson

(57) ABSTRACT

The device includes at least one target device intended to be placed in the immediate vicinity of valuables, at least one document or an object to be monitored, neutralized and/or destroyed, at least one radio transmitter of signals containing information relating on the one hand to the target device and on the other hand to the valuables, document or object in the vicinity of which it is placed, the target device comprising an antenna for receiving signals coming from the transmitter, means connected to the antenna in order to recognise in the signals from the said transmitter the information concerning on the one hand the target device and on the other hand the valuables, document and/or object in the vicinity of which it is placed, and means of detecting any abnormality in the said signals and intervention control means with a view to indicating any incident in the monitoring of the object or proceeding with the neutralization and/or destruction of the valuables or said at least one document.

20 Claims, 2 Drawing Sheets

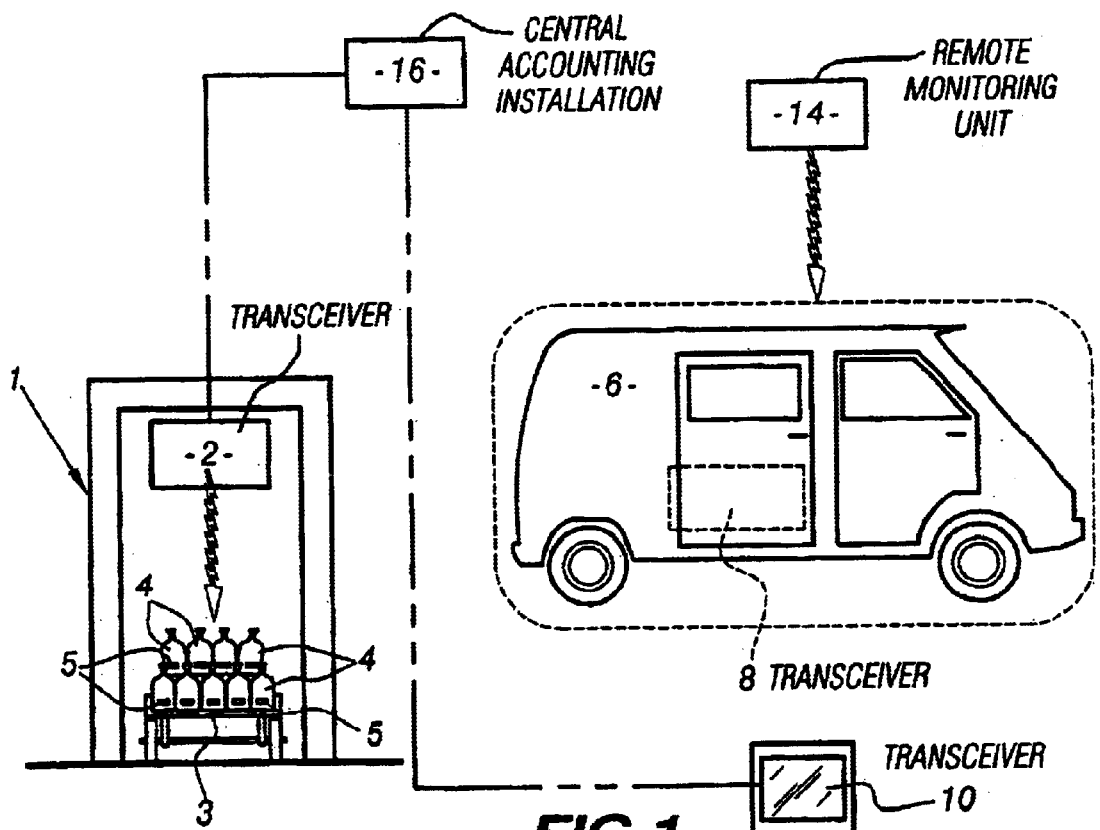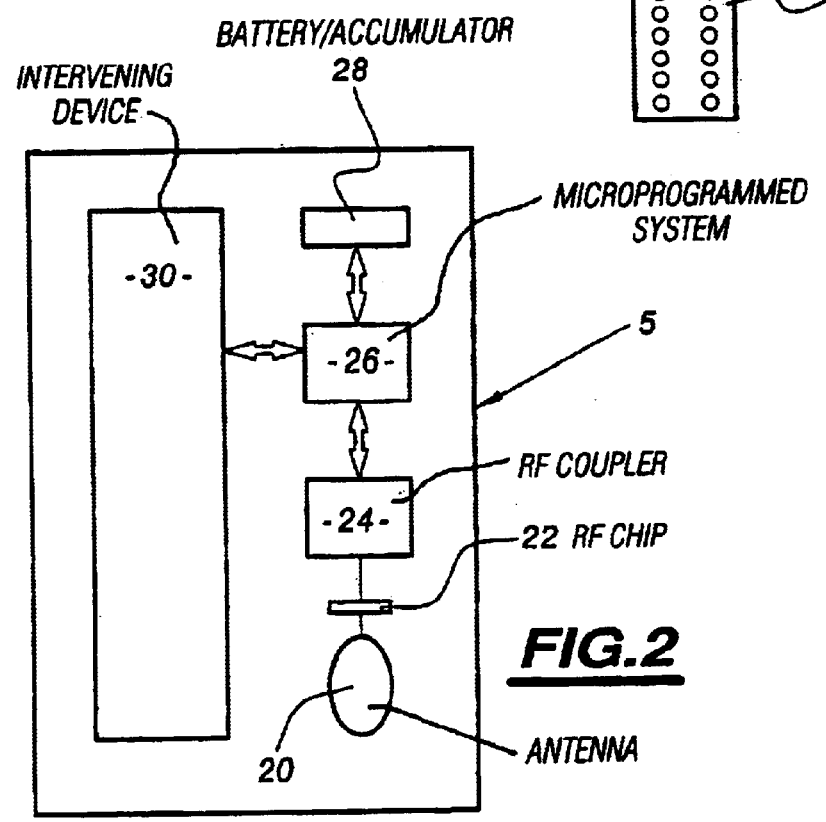

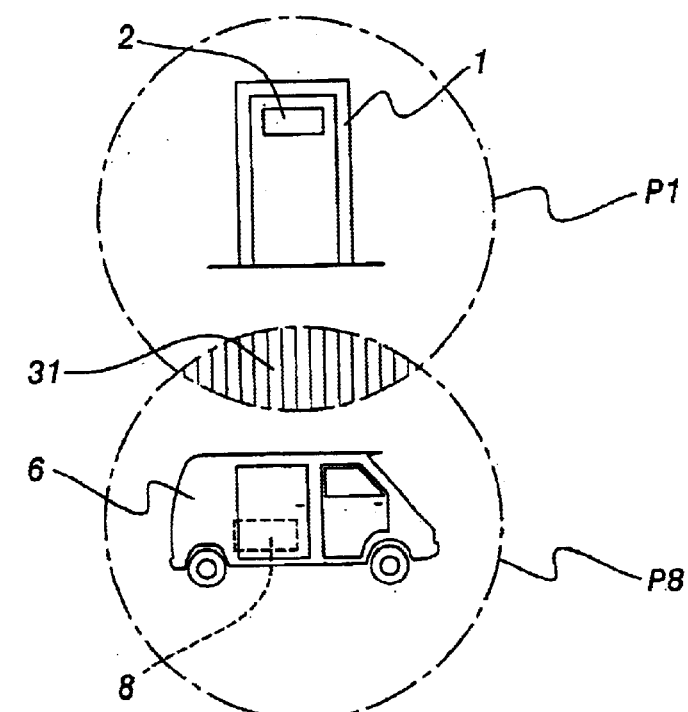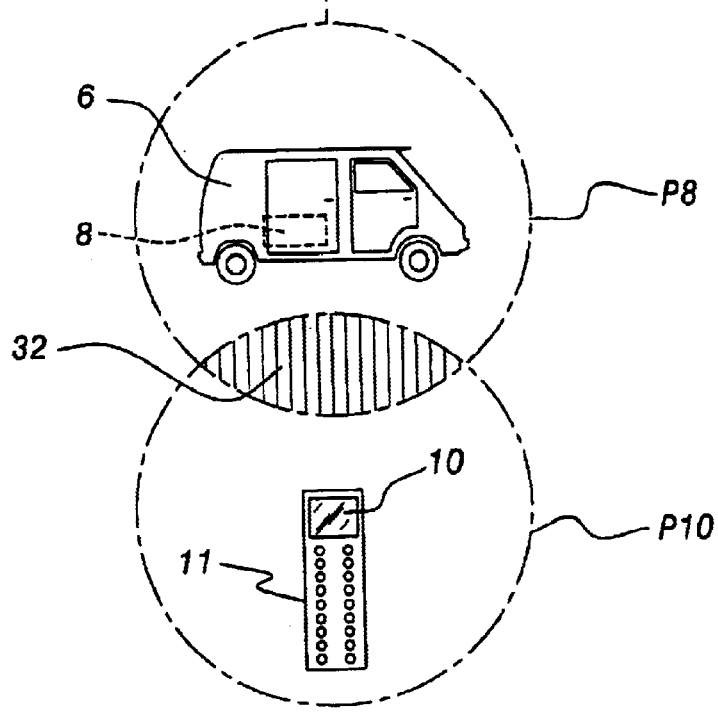
FIG.3

DEVICE FOR MONITORING, NEUTRALIZING AND DESTRUCTION OF SECURITIES, DOCUMENTS AND OTHER OBJECTS

BACKGROUND OF THE INVENTION

The present invention relates to the security devices applicable notably to the transportation of precious or confidential documents, objects and funds or the monitoring of objects of value.

DESCRIPTION OF THE PRIOR ART

Amongst the security devices for transporting funds, protected cases are known, having means of neutralising documents or bank notes which they contain, by dispersing ink notably making the notes unusable.

The aforementioned neutralisation means include, for example, a pyrotechnic triggering system in the event of an attempt at forcible entry, the triggering system being parameterisable.

However, a protected case has the drawback of containing a limited number of notes in comparison with the large volume of ink which it must contain in order to ensure neutralisation of these notes.

Moreover, the use of protected cases often requires providing transportation vehicles, whilst providing in a vehicle compartments for receiving cases and providing these compartments with means of detecting the removal of each case out of its compartment.

Such arrangements are complex and expensive.

SUMMARY OF THE INVENTION

The invention aims to mitigate the drawbacks of the existing art by creating a control/command device ensuring control of the neutralisation and/or destruction of bank notes or documents whilst they are being transported notably in armored vehicles using radio frequency technologies.

The invention also aims to create such a control/command device for ensuring the monitoring of confidential documents or objects on their storage place.

According to the present invention, there is provided a control/command device for monitoring, neutralisation and/or destruction of valuables, documents and/or objects, wherein the control/command device includes at least one target device intended to be placed in the immediate vicinity of valuables, at least one document or an object to be monitored, neutralised and/or destroyed, at least one radio transmitter of signals containing information relating on the one hand to the target device and on the other hand to the valuables, document or object in the vicinity of which it is placed, the target device comprising an antenna for receiving signals coming from said transmitter, means connected to the said antenna for recognising in the signals of said transmitter the information concerning at least the target device placed in the vicinity of the valuables, document and/or object, means of detecting any abnormality in said signals, and controlling intervention means to indicate any incident in the monitoring of the object or proceeding with the neutralisation and/or destruction of the valuables or said at least one document.

The transmitter may have a range defining a predetermined security perimeter and the abnormality detection means may be means of detecting the exit of the target device out of the security perimeter of the transmitter through absence of reception of the signal from the transmitter.

The signals coming from the transmitter received by the target device may have a predetermined repetition rate and the abnormality detection means also can include means of detecting signals received outside the repetition rate.

The abnormality detection means can include a microprogrammed system connected to the antenna by a radio frequency coupler. It can also have associated with the antenna, a device for storing an electronic label identifying the target device and the valuables, document or object in the vicinity of which it is placed.

The abnormality detection means may have in the premises of at least one fund management or transportation company, an apparatus for monitoring bags of valuables to be transported, with which there are associated target devices, the control apparatus comprising a transceiver of radio frequency signals activating the target devices in a predetermined security perimeter, defined by the transmitter of the transceiver of the monitoring apparatus and the target devices each having means of detecting the absence of activation signals because the target devices have left the security perimeter of the control and command apparatus of the means of intervention by neutralisation and/or destruction of the valuables contained in the bags.

The abnormality detection means may have means associated with the transceiver for transmitting to the electronic label storage device of each target device data identifying the target device and the valuables contained in the bag with which the target bag is associated; it may also be connected to a central compatibility system or to an integrated company management system for receiving from the said system information relating to the identification target devices and to the valuables contained in the bags with which they are associated.

The abnormality detection means may also have at least one vehicle for transporting funds intended to receive the bags of valuables to be transported with which the target devices are associated, the vehicle comprising a transceiver for radio frequency signals activating the target devices in a predetermined security perimeter defined by the transceiver of the said vehicle, the means of detecting the absence of activation and control signals for the intervention means of each of the target devices reacting to the target devices leaving the security perimeter of the vehicle in order to control the intervention means for neutralising and/or destroying the valuables contained in the said bags.

The transceiver of said at least one vehicle may be in connection with a remote monitoring unit provided with a transceiver intended to receive alarm signals coming from the vehicle in the event of attack and to send, in response to the said alarm signals, to target devices situated in the vehicle, actuation signals outside the repetition rate of the activation signals of the target devices to enable the abnormality detection means to control the intervention means with a view to neutralising and/or destroying the valuables contained in the bags with which the target devices are associated.

The monitoring unit may be construction to send, to the target devices made active, information relating to the identity of the corresponding bags currently being loaded and possibly to the value of their content.

The monitoring unit may also have, in the premises of at least one company for managing or transporting bank notes, at least one apparatus for controlling the valuables delivered to the company by a transportation vehicle with which target devices are associated, the control apparatus comprising a transceiver of radio frequency signals activating the target devices in a predetermined security perimeter defined by the transmitter of the transceiver, the means of detecting the absence of activation signals contained in each target device when a target device leaves the security perimeter controlling the intervention means with a view to neutralising and/or destroying the valuables contained in the bag with which the said target device is associated.

The control apparatus may be a fixed or portable apparatus.

The said control apparatus may be formed by a gateway.

The transceiver of the control apparatus may be associated with means of activating the target devices when the target devices are inside protected premises of a company.

BRIEF DESCRIPTION OF THE DRAWINGS

For a better understanding of the invention and to show how the same may be carried into effect, reference will now be made, by way of example, to the accompanying drawings, in which:

FIG. 1 is a block diagram of the control/command device according to the invention;

FIG. 2 is a schematic view of the target device forming part of the control/command device according to the invention; and FIG. 3 is a diagram showing the functioning of the control/command device according to the invention.

DESCRIPTION OF THE PREFERRED EMBODIMENTS

The control/command device depicted in FIG. 1 is intended, for example, to provide the monitoring of the transportation of bank notes or other securities or valuables, whilst enabling them to be neutralised and/or destroyed at a distance using the transmission of information by radio frequency.

The radio frequency command and control device depicted in FIG. 1 has several bases transmitting radio frequency signals.

A first transmitting base includes a control apparatus in the form of a gateway 1 equipped with a radio frequency signal transceiver 2 and under which there are intended to be moved for example trolleys 3 transporting bags 4 of bank notes and with which there are associated target devices such as the device 5, which will be described in more detail with reference to FIG. 2.

The control/command device also includes armored transportation vehicles such as the vehicle 6. Each of the vehicles is equipped with a radio frequency signal transceiver 8. In addition, at each delivery or removal point served by the armored vehicles 6, there is provided a radio frequency signal transceiver 10 similar to the transceivers 2 and 8 and contained either in a gateway similar to the gateway 1 or in a portable control apparatus 11.

The transceivers 2, 8 and 10 are advantageously identical.

The gateway 1 is generally situated in the premises of a bank or a company transporting funds.

As depicted in FIG. 3, the transmitter of the transceiver 2 defines a safety perimeter P1 which the target devices 5 and consequently the bank note bags 4 with which they are associated should not pass beyond.

Likewise the transceiver 8 of the armored vehicle 6 defines a security perimeter P8 comprising the volume of the vehicle 6 itself and a zone for loading and unloading the latter in a security perimeter such as the perimeter P1 defined by the gateway 1.

The transceiver 10 of the portable control apparatus 11, which can moreover also be incorporated in a gateway similar to the gateway 1, is disposed in the premises of a company such as a commercial company or a bank which is to receive or dispatch bank notes or other valuables. Its transceiver defines a security perimeter P10. The transceiver 10 of the portable apparatus 11 and the transceiver 2 of the gateway 1 are also associated with means (not shown) of deactivating the target devices 5.

The rôle of the gateway 1 and of the control apparatus 11 can also be provided by one and the same gateway or portable apparatus.

The control/command device also has a remote monitoring unit 14 provided with a transceiver intended to receive for example alarm signals coming from a vehicle such as the vehicle 6 in the event of attack and to send to the target devices 5 situated in the vehicle 6 suffering an attack actuation signal with a view to neutralising or destroying the bank notes transported by the vehicle and with which the target devices 5 are associated.

The bags containing the target devices 5 can be stored within a limit of 5 to 50 meters from any one of the radio frequency transceivers 2, 8 and 10 defining the security perimeters or protected zones P1, P8 and P10 defined above and delimiting a functional security area which is determined according to the geographical structure of the places for loading and unloading the valuables. This distance, whose lower limit is 5 meters, helps to determine the radio frequency identification technology which can be used. Frequencies of 900 MHz, 2.45 MHz or any other frequency subsequently approved by the telecommunication regulatory authority may be adopted.

Finally, the control/command device according to the invention is connected to a central accounting installation 16 or to an integrated company management system, for example of the SAP R3 type.

FIG. 2 depicts schematically a target device like the target devices 5 in FIG. 1. This target device has an antenna 20 associated with a radio frequency electronic chip 22 or microcomponent which can be either of memory technology or of microprocessor technology, intended notably to store an electronic radio frequency identification label for the target 5 as well as values with which it is associated.

The antenna 20 is connected by means of the chip 22 and a radio frequency coupler 24 to a microprogrammed system 26 supplied by a battery or accumulator 28 and connected to a device 30 for intervening by spraying an ink for neutralising the bank notes or a chemical product for destroying these notes under the control of the microprogram system 26. The operating frequencies of the frequency coupler 24 are in accordance with the current regulations.

Each target device 5 is a device which is before use in total standby mode, that is to say consuming, almost no energy. The change of this device into active mode is triggered when a transmitter such as the transceiver 2 contained in the gateway 1 is exposed to electromagnetic radiation.

As depicted in FIG. 3, the transmitter of the transceiver 2 of the gateway 1 defines a security perimeter P1.

It is assumed that the target device 5 is contained in a bag 4 of bank notes to be transported.

As depicted in FIG. 1, the bag 4 containing the target device 5 passes with a large number of other similar bags each provided with their target device, under the gateway 1 in front of the transceiver 2 which transmits an activation signal for all the target devices 5 passing through the gateway 1.

Each of the target devices such as the device 5 then changes from standby mode to active mode and periodically receives an activation signal coming from the transceiver 2.

When the bags with which the target devices 5 are associated pass under the gateway 1, the amounts of the valuables transported in each of the bags are downloaded into each target device 5. Each of these amounts, previously captured by a microcomputer, not shown, associated with the gateway 1 using for example the central accounting device 16, ensures the accounting traceability of the valuables transported but has no security objective.

Simultaneously the vehicle 6 responsible for transporting the notes whose target devices 5 have been made active receives by radio, for example from the remote monitoring unit 14, information relating to the identity of the bags currently being loaded and possibly the value of their content. The vehicle 6 is positioned by its driver so that its loading doors are situated inside the security perimeter P1 defined by the transceiver 2 of the gateway 1. The transceiver 8 of the armored vehicle 6 then defines the security perimeter P8 around the vehicle, inside which it regularly transmits, every n seconds, messages for the target devices such as the device 5, which will be situated in its security perimeter P8, that is to say which will be loaded into the vehicles, in order to keep these target devices in the active state.

The perimeters P1 and P8 define, at the time of the operations of transferring the bags of notes between the premises of the bank or of the transportation company and the armored vehicle 6, an intersection zone 31 for transportation of the bags by handlers.

The current anticollision management technology of radio frequency applications makes it possible to read the identity and the value of several tens of bags per second when passing under a gateway and throughout the duration of transportation of the bags in the armored vehicle 6. The target device 5 corresponding to each of the bags remains in active mode. The radio frequency coupler 24 of each target device 5 is interrogated continuously by the transceiver 8 of the armored vehicle 6. The radio frequency identification system of the transceiver 8 of the armored vehicle 6 transmits a validation signal every 5 to 10 seconds, for example, making it possible to keep each target device 5 in active mode according to the dead man principle used in the protection of an isolated worker.

The transceiver 8 of the armored vehicle 6 reads all the radio frequency electronic labels recorded in the electronic chips 22 of the corresponding target devices 5 and records their presence as well as the content of the valuables if this has been entered by the client or the operator and/or directly by the accounting system in the radio frequency electronic label contained in the chip 22.

This transceiver validates the quantitative data such as the number of bags and qualitative data such as the amount of the valuables contained in each bag.

As seen previously, the target device 5 associated with each bag 4 is kept in active mode throughout the duration of transfer of the bags which are kept in the security perimeter or field P1 of the gateway 1 and/or in the security perimeter or field P8 of the transceiver of the armored vehicle 6 and finally, when the vehicle 6 arrives at its destination, in the security perimeter P10 of the transceiver 10 of the portable device.

At the end of the transportation of the bank notes by the armored vehicle 6, the latter arrives at a delivery place, whose location is marked by the presence of the transceiver device 10 of the portable apparatus 11 held in the hand by an employee of the company delivering and defining the security perimeter P10 whose intersection with the security P8 of the transceiver 8 of the armored vehicle 6 delimits a zone 32 in which the transfer of the bags from the armored vehicle 6 to the premises receiving the bags of bank notes can be ensured with a maximum amount of security. The bags containing the target devices 5 are read by an employee of the transporter of funds by means of the portable terminal 11 containing the transceiver 10. They can also be disposed on a support including a transceiver such as the transceiver 10.

This terminal then provides a reading of the amount of the values contained in the bag by recognising the electromagnetic code contained in the electronic chip 22 of the target device 5 in order to verify the value of the content of each bag and to ensure accounting traceability of the valuables, and then deactivates the corresponding target device 5, which returns to standby mode. If during various handlings of the bags containing the target devices 5 a bag were to leave one of the security perimeters P1, P8 or P10, its antenna 20, no longer receiving any periodic activation signal, causes the triggering, by the microprogrammed system 26, of the device 30 for neutralising or destroying the bank notes contained in the corresponding bag.

In addition, the transporter of funds, which is represented either by the remote monitoring unit 14 of this company or by the driver of the armored transport vehicle 6, has the possibility, in the event of an attempted attack, of controlling the triggering of the target devices 5 associated with the bags 4 of bank notes situated on board the armored vehicle 6 so that they provide the process of neutralising and/or destroying the valuables by an action in positive or negative mode from the armored vehicle.

The mode of triggering in positive mode is determined by the automatic nature of the occurrence of the triggering of the process if no derogation from the current action is generated during a parameterisable time T. The negative triggering mode is determined by an intentional action of an external process or an individual on the control/command system.

Advantageously, the triggering of the target devices 5 associated with the bags 4 transported in the armored vehicle 6 is provided by the remote monitoring unit 14 on reception, from a member of the team in the armored vehicle 6, of information relating to an imminent attack or one which is currently being executed.

If, during the transfer, one of the bags containing a target device 5 in active mode is removed from the security perimeter P1 defined by the transceiver 2 of the gateway 1 or from the security perimeter P8 defined by the transceiver 8 of the armored vehicle 6 or from the security perimeter P10 of the transceiver 10 of the reception center, the target device, no longer receiving any activation signal from one of the transceivers 2, 8, 10, goes from active mode into triggered mode at the end of a predetermined time of n seconds, n being parameterisable. The triggered mode is managed automatically by a program contained in the microprogrammed system 26 of the target device 5 which, no longer receiving information coming from the radio frequency coupler 24, the latter itself no longer receiving information from any radio frequency transmitter whatsoever, and this during a parameterisable time t, causes the triggering of the device 30 for neutralising or destroying the notes contained in the corresponding bag.

The control/command device which has just been described is applied to the monitoring and neutralisation or destruction of bank notes or other valuables during their loading, transportation and unloading.

It will easily be understood that this device can also be applied to the monitoring of rare documents or precious objects, in which case, instead of controlling their neutralisation by spraying ink or their destruction, the target devices trigger alarm devices or possibly the locking of exits from the premises containing the objects as soon as the objects and their associated target devices cross the security perimeter established by the control apparatus transmitting the validation signals to the target devices.

The control/command device uses commercially available technology. A list of the components forming part of the construction of the device is given below, along with a few examples of manufacturers of such components.

| Component | Manufacturer |
| --- | --- |
| Transceiver 2, 8, 10 | EM Marin |
| | Gemplus |
| | Motorola |
| | Oberthur Card Syst. |
| | Phillips - Mikron |
| | Schlumberger |
| | ST Microelectronics |
| Target device 5 | |
| Antenna 20 and | EM Marin |
| microcomponent 22 | Gemplus |
| | Motorola |
| | Oberthur Card Syst. |
| | Phillips - Mikron |
| | Schlumberger |
| | ST Microelectronics |
| Radio frequency coupler | EM Marin |
| 24 | Gemplus |
| | Motorola |
| | Oberthur Card Syst. |
| | Phillips - Mikron |
| | Schlumberger |
| | ST Microelectronics |
| Microprogrammed system 26 | Ampro Computers, Inc. |
| | Hitex GmbH |
| | Real Time Devices USA |
| | WinSystems, Inc. |
| Remote monitoring unit 14 | Brink's |
| | CCTG |
| | CET Protection One |
| | Delta-protection |
| | Euroguard |

I claim:

1. A control/command device for monitoring, neutralisation and/or destruction of valuables, documents and/or objects, wherein the control/command device comprises:
    at least one target device intended to be placed in the immediate vicinity of valuables, documents or objects, each target device including:
        an antenna for receiving signals coming from a radio transmitter,
        means for detecting any abnormality in an activation signal emitted by said radio transmitter, and for controlling intervention means to indicate any incident in the monitoring of the object or proceeding with the neutralisation and/or destruction of the valuables, documents or objects,
        a storage device associated with said antenna for storing data identifying the target device and the valuables, documents or objects, as well as at least one qualitative data relating to the valuables, documents or objects,
    said radio transmitter:
        transmitting the activation signal, and
        transmitting to each target device the data identifying the target device and the valuables, documents or objects in its immediate vicinity as well as the qualitative data relating to the valuables, documents or objects in order to store the qualitative data and said identifying data in the storage device of the target device.

2. A control/command device according to claim 1, wherein said transmitter has a range defining a predetermined security perimeter and the abnormality detection means are means of detecting the exit of the target device out of the security perimeter of said transmitter through absence of reception of a signal from said transmitter.

3. A control/command device according to claim 1, wherein the signals emitted by said transmitter received by the target device have a predetermined repetition rate and the abnormality detection means also include means of detecting signals received outside said repetition rate.

4. A control/command device according claim 1, wherein the abnormality detection means include a microprogrammed system connected to the antenna by a radio frequency coupler.

5. A control/command device according to claim 1, wherein said storage device further comprises an electronic label identifying the target device and the valuables, document or object in the vicinity of which it is placed.

6. A control/command device according to claim 1, wherein the device comprises, in the premises of at least one fund management or transportation company, an apparatus for monitoring bags of valuables to be transported with which there are associated target devices, said control apparatus comprising a transceiver of radio frequency signals activating the target devices in a predetermined security perimeter, defined by the transmitter of the transceiver of said monitoring apparatus and the target devices each having means of detecting the absence of activation signals because the target devices have left the security perimeter of the control and command apparatus of the means of intervention by neutralisation and/or destruction of the valuables contained in the said bags.

7. A control/command device according to claim 6, wherein the device comprises means associated with the transceiver for transmitting to the electronic label storage device of each target device data identifying the target device and the valuables contained in the bag with which the target bag is associated.

8. A control/command device according to claim 6, wherein said control apparatus is a fixed apparatus.

9. A control/command device according to claim 8, wherein said control apparatus is formed by a gateway.

10. A control/command device according to claim 6, wherein said control apparatus is a portable apparatus.

11. A device according to claim 6, wherein the transceiver of said control apparatus is associated with means of activating the target devices when the target devices are inside protected premises of a company.

12. A control/command device according to claim 7, wherein the device is connected to a central accounting system or to an integrated company management system for receiving from the said system information relating to the identification target devices and to the valuables contained in the bags with which they are associated.

13. A control/command device according to claim 1, wherein the device also has at least one vehicle for transporting funds intended to receive the bags of valuables to be transported with which the target devices are associated, the said vehicle comprising a transceiver for radio frequency signals activating the target devices in a predetermined security perimeter defined by the transceiver of said vehicle, the means of detecting the absence of activation and control signals for the intervention means of each of the target devices reacting to the target devices leaving the security perimeter of the vehicle in order to control the intervention means for neutralising and/or destroying the valuables contained in the said bags.

14. A control/command device according to claim 13, wherein the transceiver of the said at least one vehicle is in connection with a remote monitoring unit provided with a transceiver intended to receive alarm signals coming from the vehicle in the event of attack and to send, in response to the said alarm signals, to target devices situated in the vehicle, actuation signals outside the repetition rate of the activation signals of the target devices to enable the abnormality detection means to control the said intervention means with a view to neutralising and/or destroying the valuables contained in the bags with which the target devices are associated.

15. A control/command device according to claim 14, wherein the monitoring unit is intended to send, to the target devices made active, information relating to the identity of the corresponding bags currently being loaded and possibly to the value of their content.

16. A control/command device according to claim 13, wherein the device comprises, in the premises of at least one company for managing or transporting bank notes, at least one apparatus for controlling the valuables delivered to the company by a transportation vehicle with which target devices are associated, said control apparatus comprising a transceiver of radio frequency signals activating the target devices in a predetermined security perimeter defined by the transmitter of the transceiver, said means of detecting the absence of activation signals contained in each target device when a target device leaves said security perimeter controlling the intervention means with a view to neutralising and/or destroying the valuables contained in the bag with which said target device is associated.

17. A control/command device according to claim 16, wherein said control apparatus is a fixed apparatus.

18. A control/command device according to claim 17, wherein said control apparatus is formed by a gateway.

19. A control/command device according to claim 16, wherein said control apparatus is a portable apparatus.

20. A control system for monitoring objects comprising:
at least one radio transmitter;
at least one target device adjacent objects to be monitored, each said target device comprising:
an antenna for receiving signals from one of said at least one radio transmitter,
a device for detecting any abnormality in an activation signal emitted by said one radio transmitter, said detecting device controlling an intervention device to activate when an abnormality is detected, and
a storage device for storing data identifying the at least one target device and said objects as well as at least one qualitative data relating to said objects.

* * * * *